United States Patent
Kurc

[15] 3,693,276
[45] Sept. 26, 1972

[54] DEVICE FOR ELECTRIC SEA-FISHING

[72] Inventor: Georges Kurc, Nantes, France

[73] Assignee: Institut Scientifique et Technique des Peches, Maritimes, Nantes, France

[22] Filed: March 3, 1970

[21] Appl. No.: 16,081

[30] Foreign Application Priority Data

March 6, 1969 France......................6906150

[52] U.S. Cl........................................43/6.5, 43/17.1
[51] Int. Cl................................................A01k 79/00
[58] Field of Search................................43/17.1, 6.5

[56] References Cited

UNITED STATES PATENTS

| | | | |
|---|---|---|---|
| 2,163,282 | 6/1939 | Hovden | 43/6.5 |
| 2,789,383 | 4/1957 | Solter | 43/17.1 |
| 3,009,278 | 11/1961 | Dethloff | 43/17.1 X |

FOREIGN PATENTS OR APPLICATIONS 879,313  10/1961  Great Britain..............43/17.1

OTHER PUBLICATIONS

Electrical Fishing with Lights and Pumps, World Fishing, June 1964, Pages 52, 55.

*Primary Examiner*—Warner H. Camp
*Attorney*—Hubbell, Cohen & Stiefel

[57] ABSTRACT

Electric sea-fishing apparatus employing an electrode array for subjecting fish to an electric field of a strength equal to or in excess of the galvanotactic threshold, the electrode structure including an anode and two cathodes arranged to define an equilateral triangle and the power source supplying a pulsating DC voltage.

15 Claims, 4 Drawing Figures

INVENTOR
GEORGES KURC
BY
ATTORNEY

INVENTOR
GEORGES KURC
BY
ATTORNEY

DEVICE FOR ELECTRIC SEA-FISHING

The present invention relates to a device for electric sea-fishing by means of a suction pump, the fish being attracted by a lighting lamp and directed towards the intake of a suction pipe by the effect of a pulsating electric field serving as a relay zone between the attracting light radiation of the lamp and the hydro-dynamic suction field of the pump. The invention relates more particularly to the means for producing a pulsating electric current in the volume of water close to the intake of the suction pipe, and to means for suitably distributing the electric field in this volume.

Deep sea fish such as sardines, sprats, anchovies, mackerel, herrings, a.s.o., are currently caught by means of rotating nets or trawls, and it is furthermore necessary to re-group shoals of fish of low density by the use of bait, before putting out the fishing nets. For this reason, the problem of catching fish without nets or bait has attracted numerous investigators, and the German DETHLOFF and the Russian Nikonorov in particular have each described their experiments at sea, carried out with success in 1964, in attracting fish with lamps and bringing them into the boat by means of a pump, the extremity of the suction pipe of which was brought to a positive electric potential.

The sensitivity of certain kinds of fish to light radiation, resulting in a positive phototropism, permits them to be attracted better than by the use of bait. However, the fish, grouped together more or less closely, will not approach close to the source of light, except in a few cases, but will remain at a certain distance from the said source, trying to find a certain optical comfort. The desired object being to obtain a sufficiently dense grouping of fish so that it may be possible to draw them onto the ship by means of a pump, it is necessary to induce them to come close to the inlet of the pump, that is to say to place themselves in the suction zone which surrounds the said inlet.

For that purpose, use is made of the power of attracting fish by electricity. To this end, galvanotaxis is employed, namely the motile response of the fish above a certain threshold value of the electric field, producing a "forced movement" of the fish, the brain messages of which are then at least partly inhibited. A fish present in such a field is compelled to swim in the direction of the anode surrounding the orifice of the suction pipe of the pump, and in this field it loses the liberty of carrying out any other movements than those which cause this directed swim. Then, sucked in by a pump of sufficient output, the fish are delivered on board the ship together with the pumped water, and are separated from this latter by means of a separator.

The object of the present invention is the perfecting of a device for industrial fishing by a method of this kind, the principles of which are well known but the development of which is especially bound up with the co-ordination of the various operational stages and with the use of a pulsating current transmitter of adequate power.

Up to the present time, insufficient attention had been given to the spatial distribution of the pulsating electric field, the function of which is to ensure an automatic transfer from the light-attraction zone up to the hydro-dynamic capture zone by the depression created around the inlet of the pump.

The spherical structure of the potential gradient round the suction orifice, as this was utilized by the first investigators, gave rise to an excessive variation of the said gradient as a function of the distance from the said orifice. Thus, the dimensions and the relative positions of the electrodes have been determined in the present invention in such manner as to obtain a greater volume in which the electric field varies less rapidly, while remaining above the galvanotactic threshold, and the intersections of this volume with the light-attraction and hydro-dynamic capture zones respectively must be large enough to ensure the easy transfer of the fish.

On the other hand, as sea water is considerably more conductive than fresh water, it is then necessary to have available a large instantaneous power for the establishment of the pulsating galvanotactic field, especially with the large sizes of electrodes necessary for fishing on a truly industrial scale.

A further object of the invention is to employ the ship's Diesel propulsion engine while the ship is anchored during fishing operations, the engine power being then wholly available for driving the electric generator which forms part of the electrical fishing device using pulsating current.

The present invention also has for its object a method of sea-fishing, in which a pulsating current creates an electric field which causes the fish to move up to the intake of a suction pipe, the distribution of the pulsating electric field being optimum and the said field being equal to or greater than that of the galvanotactic threshold.

According to another form of embodiment of the method of the invention, the zone subjected to the electric field is lighted while the periphery of said zone is partly lighted.

The present invention has also for its object a device for carrying the above method into effect, in which the said pulsating current is obtained from a positive electrode and a negative electrode located substantially in the same plane; and a second negative electrode substantially parallel to the other electrodes and located substantially at one of the apices of an equilateral triangle, the other apices of which are defined by the other electrodes.

In another form of construction of the device according to the present invention, the said pulsating current is obtained from two negative electrodes, substantially parallel to each other, and a positive electrode from which the plane is substantially perpendicular to the planes formed by the negative electrodes.

In a further form of construction of the device according to the present invention, the said negative electrodes are formed by conductors supported on a support arranged along an approximately parabolic loop, the positive electrode being located at the open extremity of the said loop.

According to a further form of construction of the device of the present invention, lighting means are arranged close to the positive electrode and preferably submerged.

According to another form of embodiment of the device of the present invention, the surface of the positive electrode is flat or is at least in part concave.

In still a further form of construction of the device according to the invention, the suction device opens into or close to the positive electrode.

In still another form of construction of the device according to the present invention, the level of mean immersion of the electrodes is lower than that of the lighting means.

The present invention has also for its object a device in which the electrodes are connected to an impulse transformer with a delay line, supplied from an electric generator and employed in the static emission of impulses of pre-determined form, duration and frequency.

The present invention has also for its object a device in which the electrodes are supplied with impulses of adjustable form, duration and frequency by a rotary electric generator set and an associated static electric circuit.

According to one form of construction of the above devices, the electric generator is driven by the ship's Diesel engine, thus constituting an electric generating set on board.

The present invention is applicable to a device for electric sea fishing and can be fixed either directly to the ship or supported by a frame which can be arranged outside of the ship during the periods of fishing.

The further objects and advantages of the present invention will become apparent from the description which follows below, reference being made to the accompanying drawings, in which.

Figure 1:
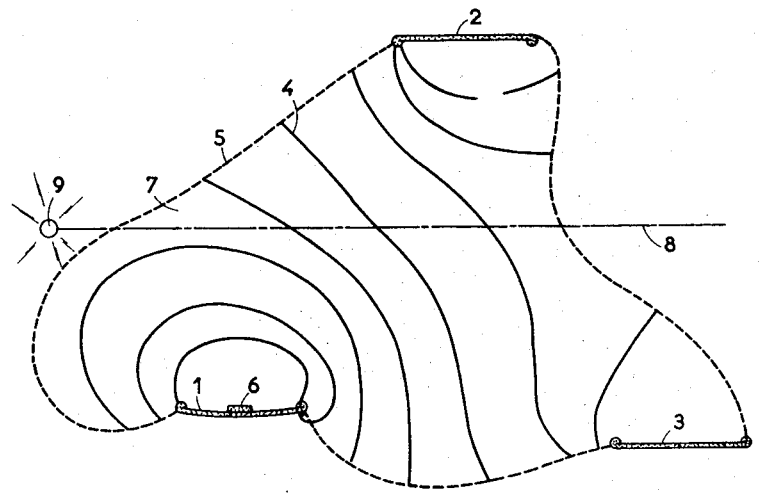
FIG. 1 shows a system of equipotential curves, seen in horizontal projection, in an arrangement having three electrodes.

In FIG. 1, by means of an experimental model with three electrodes, an anode 1 and two cathodes 2 and 3 having substantially flat and parallel surfaces, there has been drawn a series of equipotential lines 4. The drawing has been limited to the closed surface 7 defined by the electrodes and by the broken line 5. The insulating member 6 placed on the surface of the anode 1 facing the cathode 2 has the purpose of simulating the intake of the suction pipe of the fish pump, and around this intake is arranged the said anode 1, in which an orifice is formed for that purpose.

This arrangement of three electrodes disposed substantially at the apices of an equilateral triangle provides an increased volume for the fishing zone, of which the closed surface 7 represents the section through a horizontal plane showing the mean level of immersion of the said electrodes.

In all this volume there is obtained a field greater than 10 volts per meter, corresponding to the galvanotactic threshold, for example a field of 16.5 volts per meter under the effect of impulses of 350 volts providing a peak current of 4,350 amperes with an interelectrode load resistance of 0.08 ohm. Generally speaking there may be employed a generator capable of supplying impulses of 300 to 400 peak volts with a current flow of 3,400 to 4,600 amperes, which corresponds to load impedances of the order of 0.08 to 0.15 ohm, these impedances depending on the temperature and salinity of the sea water. In particular, there will be noted the manner in which the cathode 3 enables the field to be incurved, with the result that the lines of force of the field, perpendicular to the equipotential lines and not shown, are brought towards the axis 8 of the boat so that they are inclined at most at an angle of 45° to this axis. At the left-hand extremity of the axis 8, namely at the front of the boat, a source 9 of light radiation has been submerged.

Figure 2:
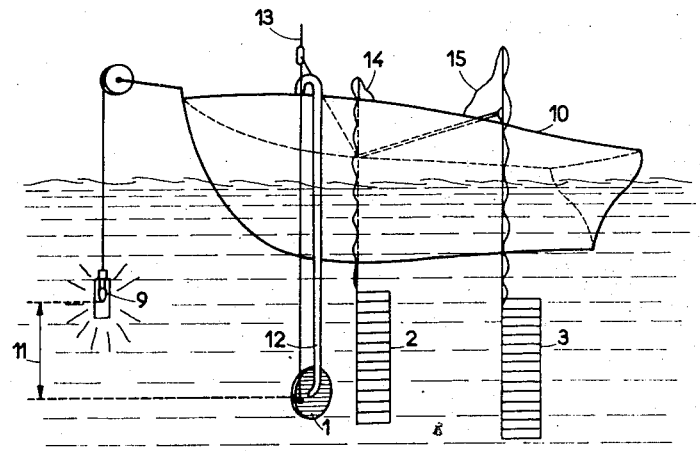
FIG. 2 shows a perspective view of a ship provided with the device having electrodes giving the same geometrical distribution as that of FIG. 1.

In FIG. 2, the boat is equipped with a device according to the invention. The source of light 9 is suspended and immersed at the bow.

In the case of utilization of an impulse generator having the characteristics defined above, the two cathodes 2 and 3 are advantageously placed at a distance of the order of 5 to 7 meters from the anode 1.

According to a particular form of embodiment illustrated by FIG. 2, the cathodes 2 and 3 are placed on each side of the boat 10, the axis of this latter forming, with the straight line joining the centers of the anode 1 and the cathode 2, an angle equal to or less than 45°, thus conforming with the geometry defined in FIG. 1. The three electrodes are lowered to a level below that of the source of light 9, the difference between the said levels being represented by 11.

The anode 1 has transverse dimensions of the order of 1 to 2 meters and advantageously from 1.25 to 1.50 m., depending on whether the distance between the anode and each of the cathodes is 7 or 5 meters. This anode should have adequate rigidity and comprises an orifice into which opens the pipe 12 connected to the fish pump. This orifice may be centered on the anode, but advantageously, according to the present invention, this orifice is displaced towards the lower portion of the anode. On the other hand, this anode is advantageously provided with a concave recess facing the suction volume defined by the electrodes.

In order to obtain a suitable distribution of the electric field while increasing the distance between the anode and the point at which the electric field reaches the galvanotactic threshold, it is advantageous to employ cathodes of unequal dimensions. For example, for a distance of 7 meters between the cathodes and the anode, and for an anode having a transverse dimension of the order of 1.25 m., it is an advantage to provide one of the cathodes with a surface area of 5 square meters and the other cathode with a surface area of the order of 7 square meters. The cathodes 2 and 3 may be rigid, or alternatively they may be made of wire netting or wire gauze, which makes it possible to roll them and facilitates their stowage in the boat. A conductor 13 connects the anode to the positive pole of the impulse transmitter, while conductors 14 and 15 respectively connect the cathodes 2 and 3 to the negative pole of the said transmitter. The electrodes are made of stainless steel or of materials not attacked by sea water, such as brass or bronze or, if so desired, of graphited metal.

Figure 3:
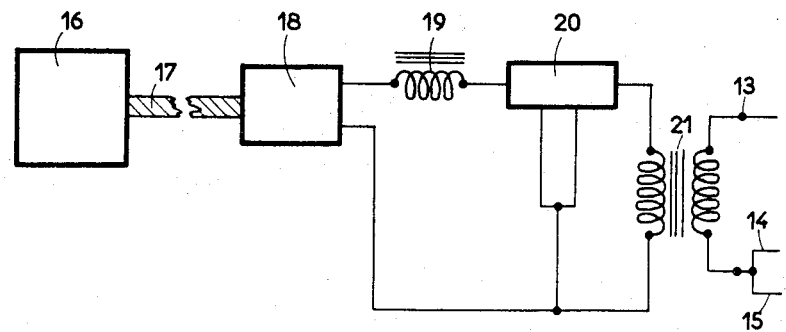
FIG. 3 shows the diagram of an impulse transmitter with a delay line and with pre-determined parameters.

In FIG. 3, the Diesel engine 16 of the boat drives a generator-rectifier unit 18 by means of the shaft 17, supplying direct current through the filtration inductance 19 to the impulse generator 20 with a delay line. A circuit of this kind is tuned so as to deliver impulses of pre-determined frequency and duration through the impulse transformer 21, to the output terminals of which are respectively connected the conductors 13 coupled to the anode 1, and 14 and 15 coupled to the cathodes 2 and 3. The characteristics of the device thus connected are determined for an optimum catch of one type of fish, according to the known parameters of the impulses valid for the said type.

Figure 4:
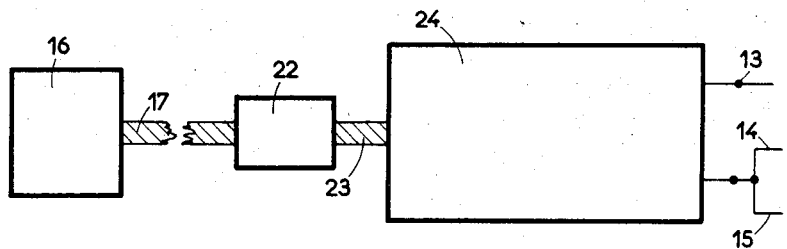
FIG. 4 is a diagrammatic view of the assembly of an electric generating set, the generator of which supplies the electrodes with impulses having adjustable parameters.

In FIG. 4, the Diesel engine 16 drives, by means of the shaft 17, a speed multiplier 22, having its output shaft 23 coupled to an assembly 24 comprising an electric generator and a static circuit, producing impulses with adjustable parameters, and to the terminals of which are connected the supply wires of the electrodes, having the appropriate polarities.

In an installation of this kind, the diameter of the pipe 12 is of the order of 20 centimeters for a pump having an output of at least 300 cubic meters per hour, preferably driven by an electric motor.

It will of course be understood that the present invention is not limited to the particular form of embodiment described above, but that it is capable of receiving numerous alternative forms understood by those skilled in the art, without thereby departing from the scope of the invention.

In particular, the number, the dimensions and the relative positions of the electrodes must be such that the optimum distribution of the pulsating electric field is always obtained.

Thus, the method of mounting the electrodes, placed so as to form an equilateral triangle, can be carried out in a large number of alternative ways. In particular, it is equally possible to provide a triangular frame for carrying the electrodes, this frame being submerged at the stern of the boat by means of any known type of lifting gear, preferably a crane or davits.

In addition to the known forms of impulses, the variable-parameter transmitter enables the duration of the impulses to be varied between 0.2 and 10 milliseconds, while their repetition frequency can be regulated from about 0 to 150 periods per second, in order to have available the desired full flexibility of use so as to adapt the apparatus to all conditions of fishing and to any variety of deep sea fish.

Finally, the advantage of this electric fishing device is that it only subjects the largest fish to the effects of galvanotaxis, while preserving the younger classes of fish which are consequently shorter in length and less sensitive to the small potential difference established between their heads and their tails. This method of fishing is therefore selective and thus permits the preservation of the younger classes of fish better than by regulations concerning the size of mesh of the nets.

What I claim is:

1. Apparatus for electric sea-fishing, in which a pulsating electric current creates an electric field having an intensity at least equal to the galvanotactic threshold of the fish in a pre-determined volume of water, thus inducing the fish to move toward the intake of a suction pipe, said apparatus being characterized in that it comprises:

means for generating said pulsating electric current;
   a substantially planar positive electrode vertically immersed in the water;
   a first substantially planar negative electrode located substantially in the same plane as said positive electrode and vertically immersed in the water;
   a second substantially planar negative electrode located substantially parallel to said positive and said first negative electrodes and displaced transversely therefrom and immersed in the water to define a substantially equilateral triangular configuration with said positive and said two negative electrodes at the apices thereof;
   and means for connecting said generating means to said positive and negative electrodes.

2. Apparatus according to claim 1, further comprising a source of light immersed in the water in a vertical plane substantially equidistant from the vertical plane containing said positive electrode and said first negative electrode and the vertical plane containing said second negative electrode, beyond the side of said equilateral triangle joining said positive electrode and said second negative electrode.

3. Apparatus as claimed in claim 2, in which the mean level of immersion of said electrodes is lower than that of said source of light.

4. Apparatus as claimed in claim 1, characterized in that said suction pipe is associated with a pump mounted on board a fishing boat and adapted to pump the fish into said boat, said suction pipe opening at said positive electrode.

5. Apparatus as claimed in claim 1, characterized in that the surface of said positive electrode is substantially flat.

6. Apparatus as claimed in claim 1, characterized in that the surface of said positive electrode is, at least in part, concave, facing said volume.

7. Apparatus as claimed in claim 1, characterized in that said electric generating means supplies current to an impulse transformer with a delay line, adapted for the static transmission to said electrodes of electrical impulses of pre-determined and variable form, duration and frequency.

8. Apparatus as claimed in claim 7, characterized in that said electric generating means comprises a rotary electric generator associated with a static electric circuit.

9. Apparatus as claimed in claim 8, characterized in that said electric generator is adapted to be driven by the propulsion motor of a fishing boat, thereby constituting an electric generating set on board.

10. Apparatus according to claim 9, wherein said negative electrodes extend higher than said positive electrode.

11. Apparatus as claimed in claim 1, characterized in that the specified devices are all fixed directly on a fishing boat.

12. Apparatus according to claim 1, further comprising a light source, said source of light being immersed in the water.

13. Apparatus according to claim 1, wherein the distance between any two of the said electrodes is comprised substantially between 5 and 7 meters.

14. Apparatus according to claim 1, wherein said positive electrode has a vertical dimension comprised substantially between 1 and 2 meters.

15. Apparatus according to claim 14, wherein the vertical dimension of said positive electrode is comprised substantially between 1.25 and 1.50 meters.

* * * * *

PO-1050
(5/69)

UNITED STATES PATENT OFFICE
CERTIFICATE OF CORRECTION

Patent No. 3,693,276       Dated September 26, 1972

Inventor(s) Georges Kurc

It is certified that error appears in the above-identified patent and that said Letters Patent are hereby corrected as shown below:

Column 1, Line 4, "lighting" should read --lighted--.
Column 1, Line 15, "a.s.o." should read --etc.--.
Column 1, Line 33, delete "said".
Column 1, Line 39, delete "said".
Column 2, Line 4, delete "said" in both instances.
Column 2, Line 30, delete "said".
Column 2, Line 39, delete "said".
Column 2, Line 47, delete "said".
Column 2, Line 53, delete "said".
Column 2, Line 57, delete "said".
Column 3, Line 49, delete "said".
Column 3, Line 56, delete "said".
Column 4, Line 25, delete "said".
Column 4, Line 57, delete "said".
Column 5, Line 5, delete "said".
Column 5, Line 34, "impulses" should read --pulses--.
Column 5, Line 36, "impulses" should read --pulses--.
Column 5, Line 38, "periods" should read -pulses--.

Signed and sealed this 11th day of March 1975.

(SEAL)
Attest:

RUTH C. MASON
Attesting Officer

C. MARSHALL DANN
Commissioner of Patents
and Trademarks